United States Patent Office 2,942,089
Patented June 21, 1960

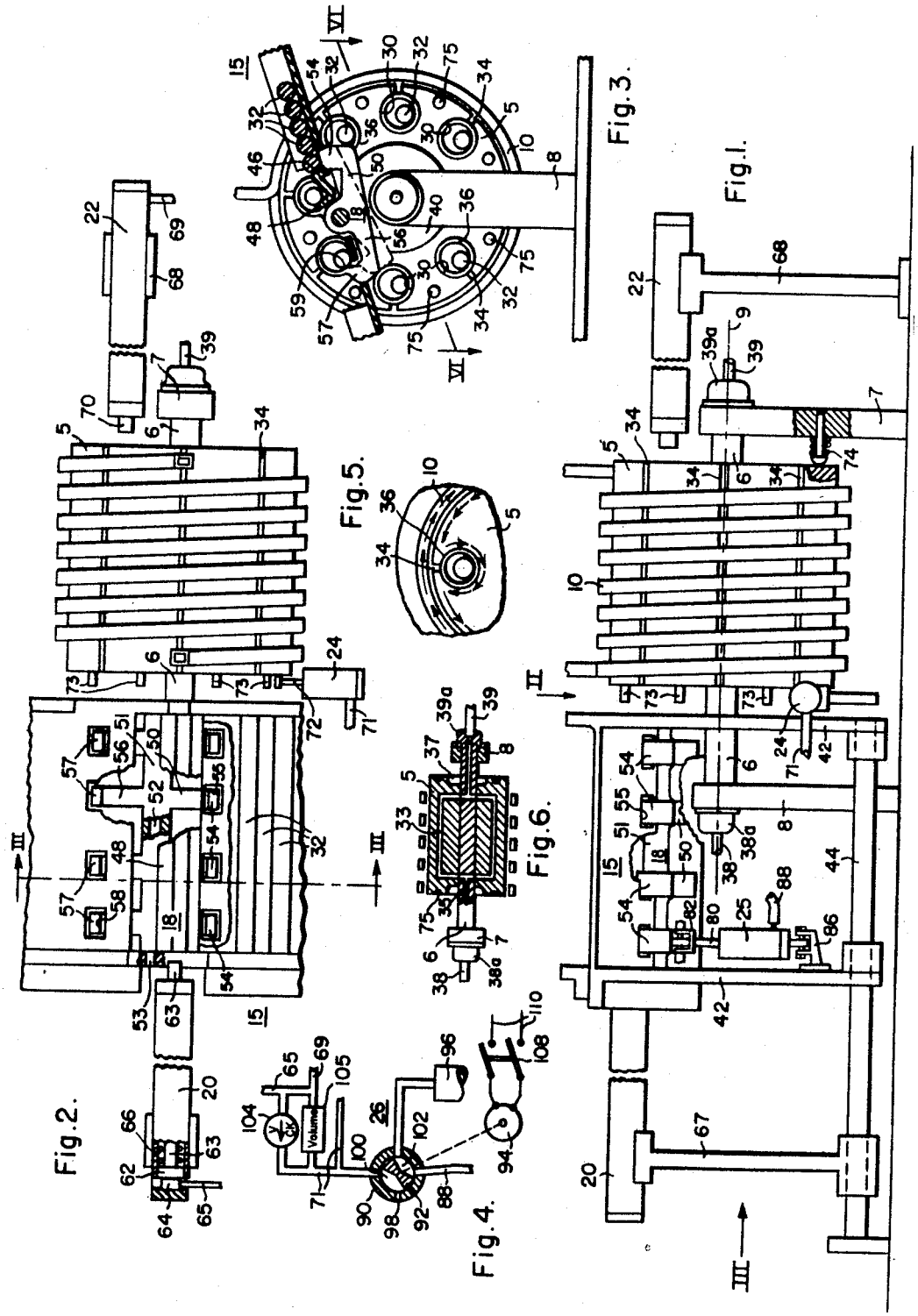

2,942,089
INDUCTION HEATING APPARATUS

Robert M. Baker, Catonsville, and John M. Edwards, Riderwood, Md., assignors to Westinghouse Electric Corporation, East Pittsburgh, Pa., a corporation of Pennsylvania Filed July 17, 1958, Ser. No. 749,288

5 Claims. (Cl. 219—10.69)

This invention relates to induction heating apparatus, and more particularly to such apparatus for heating elongated workpieces.

A principal object of the invention is to provide an improved apparatus for inductive heating of elongated workpieces, such as metal rods, in a continuous process.

A more specific object of the invention is to provide a simple and effective apparatus for inductive heating of a plurality of elongated workpieces while being moved through a circular heating path by rotary workpiece carrier means.

A further object of the invention is to provide apparatus in accord with the preceding objects, further characterized in that the rotary workpiece carrier means revolves within an induction heating coil and acts as flux concentrating means for increasing the heating currents induced in the workpieces.

Another object of the invention resides in the provision of apparatus in accord with the preceding objects, further characterized in that the rotary carrier means comprises a cylindrical member having a plurality of circumferentially spaced-apart openings extending longitudinally therein for accommodation of the workpieces.

Another object of the invention resides in the provision of apparatus in accord with the preceding objects, further characterized in that turning movement of the rotary workpiece carrier means is effected intermittently to permit introduction of an unheated workpiece and removal of a heated workpiece during the interval between successive turning movements of such carrier means.

Still another object of the invention resides in the provision of apparatus in accord with the preceding objects, further characterized in the embodiment of means for effecting the turning movement of the workpiece carrier means intermittently and the loading and unloading of the workpieces into and out of such carrier means.

A still further object of the invention resides in the provision of apparatus in accord with the preceding objects, further characterized in that the workpieces are inserted into and removed from the same end of the workpiece carrier whereby workpiece movement to and from the heating apparatus will occur along a common path.

Other objects and advantages of the invention will become apparent from the following detailed description when taken in connection with the accompanying drawings, in which:

Figure 1 is a side elevation view showing in outline the induction heating apparatus embodying the invention;

Fig. 2 is a plan view of the apparatus taken in the direction of the arrow II in Fig. 1, with certain parts broken away and shown in section;

Fig. 3 is an end elevation view of the apparatus taken in the direction of the arrow III in Fig. 1;

Fig. 4 is a schematic representation of means for controlling operation of the apparatus shown in Figs. 1 to 3;

Fig. 5 is a fragmentary view showing current flow in a portion of member 5 as constructed to function as a flux concentrator in addition to acting as a means for carrying workpieces; and Fig. 6 is a sectional view, taken along the line VI—VI in Fig. 3, showing details of a water cooling means employed in the induction heating apparatus.

Referring to Figs. 1 to 4 in the drawings, in which like reference numerals designate like parts in the several views, the illustrated embodiment of the invention comprises, in general, a cylindrical workpiece carrier member 5 mounted through the medium of a shaft 6 and pedestals 7, 8 for rotary movement about an axis 9 within an induction heating coil 10 adapted at its opposite ends to be energized with suitable alternating current power and preferably to be non-rotatably supported in a fixed coaxial position encircling the cylindrical workpiece carrier member 5, by suitable means (not shown); a workpiece conveyor table 15 disposed at one end of rotary carrier member 5; workpiece-handling means 18 associated with table 15; motor means 20 for moving workpieces from table 15 into carrier member 5; motor means 22 for moving workpieces out of furnace carrier member 5 onto table 15; motor means 24 for effecting rotary movement of carrier member 5; motor means 25 for actuating the workpiece-handling means 18; and control means 26 for controlling operation of motor means 20, 22, 24 and 25.

According to a feature of the invention, the cylindrical workpiece carrier member 5 is provided with a plurality of circumferentially spaced-apart longitudinal cylindrical openings 30 to accommodate disposition of respective elongated workpieces 32, which, as illustrated, may be in the form of cylindrical bars of metal. Member 5, at least in its outer peripheral region embracing the openings 30, is composed of material, such as copper, having high electrical conductivity. Member 5 is provided at its outer periphery with respective longitudinal slots 34 opening radially into the openings 30. Each slot respective to the portion of member 5 encircling an opening 30 enables such portion to act as a flux concentrator energized by the coil 10 to direct the current through an arcuate path around such opening, as indicated by the arrows in Fig. 5, for more effective induction of heating currents in the respective workpiece 32. To reduce transmission of heat from the workpieces 32 to the member 5 and to the coil 10, as well as to prevent the workpiece from short-circuiting such member across the slots 34, each of the workpiece-accommodating openings 30 is provided with a liner 36 of refractory material.

Since, even in the presence of such liners, heat from the workpieces 32 will reach the member 5 and the coil 10, cooling of these components may be taken care of by making the coil 10 of hollow tubing, as may be seen in Fig. 2 to enable such coil 10 to act as a conduit through which cooling water may be circulated, and by circulation of cooling water through cooling water passages 33 in member 5, Fig. 6, extending longitudinally therethrough at circumferentially spaced-apart intervals therearound between the workpiece-accommodating openings 30 and opening radially inward at opposite ends to common water inlet and exit passages 35 and 37, respectively, located in shaft 6 and connected to respective water supply and discharge conduits 38 and 39 via rotary seal members 38a and 39a.

It has been established that in a stationary setup, uniform heating of a workpiece encircled by a concentrator without creation of undue temperature variation in such workpiece, relies upon the somewhat exact positioning of the workpiece concentrically within the concentrator; and further that such non-uniformity of heating may be eliminated by rotation of the workpiece.

As will be apparent from the showing in Fig. 3, in addition to providing a convenient and compact arrangement whereby workpieces may be made to enter and leave an induction heater apparatus at relatively short intervals of time while permitting each workpiece to remain in such heater for longer than such short intervals of time, the rotary workpiece carrier member 5 of the induction heater portion of the apparatus causes the elongated workpieces 32 disposed within the openings 30 to roll on the inner surfaces of liners 36 during turning movement of member 5, thereby turning these workpieces, and thus enabling such member 5 to also function as an effective flux concentrator for highly efficient inductive heating of a variety of sizes and shapes of elongated workpieces of substantially round cross section. Furthermore, where the diameter of the workpiece approaches the inner diameter of liner 36, the degree of rolling movement of the workpiece during rotary movement of member 5 becomes less, but the resultant reduction in turning movement of the workpiece is in conformity with the lesser degree of eccentricity between workpiece and opening, and therefore variation in size of workpiece is compensated for automatically.

Rotary member 5 is internally supported on the shaft 6, for rotation therewith about axis 9, through the medium of a central hub portion 40 which may be of any suitable form and preferably made integral with the remainder of such member.

Pedestals 7 and 8 supporting the shaft 6 may be floor-mounted as shown in the drawing, or attached to a suitable subbase if desired.

The alternating current power supplied to the heating coil 10 will preferably be of a frequency in the neighborhood of 1,000 to 10,000 cycles per second chosen to provide efficient heating of the size or sizes of workpieces heated.

The workpiece conveyor table 15, disposed adjacent one end of the induction heater portion of the apparatus, is preferably supported by means such as spaced-apart legs 42 which, in turn, are slidably supported on fixed support rod means 44 to permit adjustment in table position proximitywise of such heater portion to suit different operating conditions of the heating apparatus with respect to longitudinal dimensions of the workpieces as well as to suit the lengthwise portion of such pieces which it may be desired to heat. The upper surface of the table 15 is flat and tilted to permit gravity-induced movement of workpieces therealong, by rolling and/or sliding movement, for introduction and automatic advancement of workpieces at its upper end and ejection of workpieces from its lower end. One tilted end of the table 15 traverses the adjacent surface of the carrier member 5 in a manner which enables successive exposure of the ends of adjacent openings 30 two at a time to spaced-apart workpiece injection and ejection stations, respectively, on said table.

Workpieces fed by means (not shown) onto the uppermost portion of the tilted table top will roll and/or slide downwardly into engagement with a workpiece stop shoulder 46 extending transversely of the table top adjacent to the workpiece injection station located for registry with successive ones of the openings 30 during intermittent rotary movement of the member 5. A feed trough member 48, shown as being formed integrally with the table top, is fixed to table 15 adjacent to the stop shoulder 46 at the injection station, to define a guideway for injection of workpieces into the openings 30 when brought successively into alignment with such trough member by intermittent rotary movement of the member 5.

The workpiece-handling means 18 associated with the table 15 comprises a plurality of parallel arms 50 extending in a general radialwise direction from a common sleeve member 51 journalled on a shaft 52 which, in turn, is journalled at its opposite ends to suitable portions of the table, as shown at 53 in Fig. 2 with respect to one end of such shaft. Arms 50 are disposed beneath the top of table 15 and each carries an upwardly extending finger 54 adapted to be raised upwardly through a respective opening 55 through the table top and located immediately adjacent to the stop shoulder 46. The several lift fingers 54 during upward movement through respective openings 55 at spaced-apart intervals laterally of the top of table 15 adjacent to the workpiece stop shoulder 46, as may be understood by referral to the showing in Fig. 3, provides for raising a workpiece 32 along such stop shoulder to permit same to roll by gravity into the guideway defined by the trough member 48 in preparation for axialwise movement of such workpiece into a respective opening 30 in carrier member 5. Such feeding of a workpiece 32 into the trough member 48 by upward movement of the fingers 54 may be effected by counterclockwise movement of the arms 50 and sleeve member 51 about the axis of the shaft 52. Subsequent to advancing a workpiece 32 into the feed trough member 48, retraction of the fingers 54 downwardly by counterclockwise movement of the arms 50 and sleeve member 51, as viewed in Fig. 3, to enable the same to return to the respective positions in which they are shown on the drawing, permits the workpieces 32 to roll down the table top until the next succeeding one of same engages the stop shoulder 46. By repetition of such operation, it will be appreciated that successive workpieces may be fed automatically into the trough member 48 following successive injection of the trough-supported ones of such workpiece into respective openings 30.

In substantially a similar arrangement, the workpiece-handling means 18 also comprises a plurality of oppositely extending arms 56 (Fig. 3) attached to sleeve member 51 which carry respective fingers 57 normally disposed in projection upwardly through respective openings 58 (Fig. 2) in the table top. A common face 59 of the several fingers 57 will be in alignment while fingers 57 are projecting upwardly through openings 58, for cooperation with a workpiece during its ejection from the member 5 to prevent tilting of such workpiece and damage to the refractory liner 36 along which such workpiece slides during such ejection. By virtue of connection of the fingers 57 to sleeve member 51 through the medium of respective arms 56, turning movement of such sleeve member in effecting raising of the fingers 54 for advancement of workpiece 32 into the trough member 48 will simultaneously effect downward movement of the fingers 57 through respective openings 58 to free the heated workpiece for ejection from the induction heating apparatus along the table 15.

The motor means 20 for moving workpieces from the table 15 by sliding movement along the trough member 48 into the member 5 may be in the form of a fluid pressure cylinder device as shown in the drawings, and referring to Fig. 2 in particular, such cylinder device may simply comprise a piston 62 operatively connected to a piston rod 63 for advancing same longitudinally along such trough member 48 responsively to supply of fluid under pressure to a chamber 64 via a conduit 65. For retraction of the piston rod 63 to the reposed position in which it is shown in the drawing, the motor 20 may simply comprise the usual return spring 66 as shown. Motor means 20 may be mounted on a pedestal 67 for support and alignment with the trough member 48 and such pedestal means 67 may, in turn, be slidably supported on fixed support rod means 44 in common with pedestals 42 associated with the table 15 to permit adjustment in axialwise positioning of such motor means 20 with respect to the table 15 to compensate for different workpiece lengths and degrees of penetration of same into the furnace member 5.

Motor means 22 is mounted on suitable pedestal means 68 for disposition at the opposite side of the furnace member 5 in proper alignment with the workpiece injection station located on the table 15, and such motor means 22 also preferably will be in the form of a fluid pressure cylinder device similar to that of motor means 20 and having piston means, not shown, responsive to supply of fluid under pressure via a conduit 69 to advance a piston rod 70 at successive intervals through the openings 30 in the member 5 to displace the heated workpieces therefrom onto the table 15 along the aligned faces 59 of fingers 57, as afore-described.

For effecting turning movement of the carrier member 5 in successive steps of equal increment corresponding to spacing of the openings 30, for sake of illustration, the motor means 24 may be in the form of a fluid pressure cylinder device which is responsive to supply and release of fluid under pressure to and from a conduit 71 to respectively advance and retract a piston rod 72 into and out of displacing engagement with each of a plurality of actuator pins 73 attached to one end of the member 5 and suitably spaced circumferentially therearound according to the number and disposition of the openings 30. Detent means 74 (Fig. 3) associated with pedestal 7, for example, may be provided for cooperation with suitable recesses 75 formed in the respective end face of the member 5 to define the successive stop positions of such member and thereby assure proper registry of the openings 30 with respect to location of the injection and ejection stations at the table 15.

Referring to Fig. 1, motor means 25 also may be in the form of a fluid pressure cylinder device comprising a piston and return spring means (not shown) operatively connected to the workpiece-handling means 18 through the medium of a piston rod 80 and pivotal connecting means 82 associated with one arm 50 of said workpiece-handling means 18. Motor means 25 may be pivotally supported at its lower end by a member 86 attached to one of the pedestal legs 42. Motor means 25 is adapted to respond to supply of fluid under pressure to a conduit 88 for rocking the means 18 in the direction for raising the fingers 54 and lowering the fingers 57, as aforedescribed, and to respond to release of fluid under pressure via said conduit 88 to lower and raise fingers 54 and 57, respectively.

In referring to Fig. 4, the control means 26, for sake of illustration, may simply comprise selector valve means in the form of such as a rotary valve device 90 having a rotary valve 92 operable by electric motor means 94 to control of fluid under pressure from a fluid pressure source 96 to fluid pressure conduits 65, 69, 71 and 88 and release of fluid under pressure from these conduits via an exhaust port 98. Rotary valve 92 is provided with cavities 100 and 102 arranged such that when the conduit 88 is connected to the source 96, conduits 65, 69 and 71 will be connected to the exhaust port 98, and vice versa, and the workpiece-handling means 18 actuated by motor means 25 will be operated to place a workpiece 32 in the trough member 48 and to release a heated workpiece from the influence of the fingers 57 prior to operation of the motor means 20 and 22 for injection and ejection of workpieces to and from the carrier member 5, as afore-described. A parallel-arranged check valve 104 and volume chamber 106 are interposed between conduits 65, 69 and 71 to assure that motor means 24 will be operated to advance the carrier member 5 to a new position prior to operation of motor means 20 and 22 for the workpiece injection and ejection operations. Well-known switch means 108 may be provided for controlling energization of the electric motor means 94 by source wires 110.

Other minor variations with respect to actuation of workpieces into and out of member 5 might include the provision of an auxiliary support member or members arranged to rotate with such member 5 and to project beyond its infeed end for support of workpieces extending only part way into openings 30, as in end heating; the provision of respective auxiliary ceramic bushings disposed in the ceramic liners 36 for engagement with workpiece ends to define workpiece insertion limit positions while permitting insertion of workpiece ejection rod 70 through such bushings; and/or the provision of simplified workpiece-handling mechanism wherein a workpiece to be heated is fed into one end of member 5 while a heated workpiece is pushed out the other side of such member, by employment of a pair of pusher rods actuated simultaneously through the medium of a member common to each.

Although the invention is described in connection with certain specific embodiments, it will be apparent to those skilled in the art that various changes in form and arrangement of parts can be made to suit requirements without departing from the spirit and scope of such invention. In this respect, it will be apparent that other means may be used for controlling operation of the various fluid pressure motor means and that such motor means, for example, may take other forms.

We claim as our invention:

1. Induction heating apparatus comprising cylindrical heating coil means having a horizontal axis and through which primary current flows, an electrically-conductive cylinder member disposed coaxially within said coil means for rotation about said horizontal axis, said cylinder member having a plurality of circumferentially-spaced-apart axialwise-extending openings for accommodation of elongated cylindrical workpieces and having a corresponding number of grooves extending from its periphery into said openings, respectively, to cause concentration of secondary current around said openings individually for more effective induction of heating current in the workpieces disposed therein, a plurality of cylindrical liner members of heat-durable electrically-insulating material disposed in said openings, respectively, for direct support of workpieces disposed in said openings, and means for effecting turning movement of said cylinder member whereby workpieces disposed in said openings will turn on their own axes by rolling movement along the inner surfaces of said liner members.

2. Induction heating apparatus comprising heating coil means having a horizontal axis, an electrically-conductive cylinder member disposed coaxially within said coil means, said cylinder member being rotatable about said horizontal axis, said cylinder member having a plurality of circumferentially-spaced-apart openings extending in an axialwise direction therethrough and having a corresponding number of grooves extending from its periphery into said openings, respectively, to cause concentration of secondary current around said openings individually, a plurality of cylindrical liner members of heat-durable electrically-insulating material disposed in said openings, respectively, cylinder-member-actuating means for effecting successive turning movements of said cylinder member in increments equal to the angular spacing between said openings, and workpiece-actuating means operable during the interval between said successive turning movements to inject and eject respective workpieces into and out of said cylinder member.

3. Induction heating apparatus comprising heating coil means having a horizontal axis, a rotatable electrically-conductive cylinder member disposed coaxially within said coil means, said cylinder member having a plurality of circumferentially-spaced-apart openings extending in an axialwise direction therethrough and having a corresponding number of grooves extending from its periphery into said openings, respectively, a plurality of cylindrical liner members of heat-durable electrically-insulating material disposed in said openings, respectively, cylinder-member-actuating means for effecting successive turning movements of said cylinder member about said horizontal axis in increments equal to the angular spacing between said openings, workpiece-actuating means operable during the interval between such successive turning movements to inject and eject respective workpieces into and out of said cylinder member, and control means for effecting operation of said cylinder-member-actuating means and of said workpiece-actuating means sequentially.

4. Induction heating apparatus comprising heating coil means, a rotatable cylinder member disposed coaxially within said coil means and having a plurality of circumferentially-spaced-apart workpiece-accommodating openings extending in an axialwise direction therethrough, cylinder-member-actuating means for effecting successive turning movements of said cylinder member in increments equal to the angular spacing between said openings, a stationary workpiece conveyor table extending from an input end downwardly past one end of said cylinder member to an output end, stop means defining a shoulder extending transversely of said table against which elongated workpieces fed to said input end may stack as a single layer in parallel abutting relationship, guide means at an injection station adjacent to said stop means to guide successive movement of workpieces into said openings, respectively, when brought successively into alignment therewith, workpiece-lifting means operable successively to raise workpieces along said stop means into said guide means, retractable guide means cooperable with said table at an ejection station adjacent to said injection station to guide successive workpieces in emergence from said openings, respectively, when brought successively into alignment therewith, ejection motor means operable intermittently to displace heated workpieces from the aforesaid openings successively onto said table at said ejection station, injection motor means operable intermittently to displace workpieces along said guide means into said openings successively subsequent to their being evacuated by operation of said ejection motor means, cylinder-member-actuating means for effecting successive turning movements of said cylinder member in increments equal to the angular spacing between said openings and in a direction to carry said openings past said ejection station and injection station in named order, and motor means for actuating said workpiece-lifting means and said retractable workpiece guide means.

5. Induction heating apparatus comprising heating coil means, a rotatable cylinder member disposed coaxially within said coil means and having a plurality of circumferentially-spaced-apart workpiece-accommodating openings extending in an axialwise direction therethrough, cylinder-member-actuating means for effecting successive turning movements of said cylinder member in increments equal to the angular spacing between said openings, a stationary workpiece conveyor table extending from an input end downwardly past one end of said cylinder member to an output end, a stop means defining a shoulder extending transversely of said table against which elongated workpieces fed to said input end may stack as a single layer in parallel abutting relationship, guide means at an injection station adjacent to said stop means to guide successive movement of workpieces into said openings, respectively, when brought successively into alignment therewith, workpiece-lifting means operable successively to raise workpieces along said stop means into said guide means, retractable guide means cooperable with said table at an ejection station adjacent to said injection station to guide successive workpieces in emergence from said openings, respectively, when brought successively into alignment therewith, ejection motor means operable intermittently to displace heated workpieces from the aforesaid openings successively onto said table at said ejection station, injection motor means operable intermittently to displace workpieces along said guide means into said openings successively subsequent to their being evacuated by operation of said ejection motor means, cylinder-member-actuating means for effecting successive turning movements of said cylinder member in increments equal to the angular spacing between said openings and in a direction to carry said openings past said ejection station and injection station in named order, motor means for actuating said workpiece-lifting means and said retractable workpiece guide means, and automatically operated selector valve means for controlling operation of the several aforesaid motor means.

References Cited in the file of this patent

UNITED STATES PATENTS

| | | |
|---|---|---|
| 1,885,966 | Viry | Nov. 1, 1932 |
| 2,353,130 | Dravneek | July 11, 1944 |
| 2,385,031 | Schneider et al. | Sept. 18, 1945 |
| 2,442,968 | Dierwirth | June 8, 1948 |